United States Patent

Nagaoka et al.

[11] Patent Number: 5,307,984
[45] Date of Patent: May 3, 1994

[54] METHOD OF MANUFACTURING A SELECTIVE ISOLATION SCREEN

[75] Inventors: Tadayoshi Nagaoka, Mihara, Japan; Derry D. Sparlin, Spring, Tex.

[73] Assignee: Nagaoka International Corp., Japan

[21] Appl. No.: 992,556

[22] Filed: Dec. 18, 1992

[30] Foreign Application Priority Data

Dec. 27, 1991 [JP] Japan ................ 3-360493

[51] Int. Cl.5 .............. B23K 31/02; E03B 3/18; E21B 43/08
[52] U.S. Cl. ................. 228/189; 166/233; 29/163.7
[58] Field of Search ......... 166/233, 236; 29/163.7; 228/189

[56] References Cited

U.S. PATENT DOCUMENTS

| 77,772 | 5/1868 | Skilling | 166/233 |
| 1,594,788 | 8/1926 | McLaughlin et al. | 29/163.7 |
| 3,712,373 | 1/1973 | Bearden et al. | 166/233 |
| 4,378,840 | 4/1983 | Lilly | 166/233 |
| 4,771,829 | 9/1988 | Sparlin | 166/233 |

Primary Examiner—Paula A. Bradley
Assistant Examiner—Jeffrey T. Knapp
Attorney, Agent, or Firm—Hedman, Gibson & Costigan

[57] ABSTRACT

A method of manufacturing a selective isolation screen includes steps of fitting a plurality of screen jackets one by one on a base member, each of the screen jackets including a plurality of spacer members extending in the longitudinal direction to be disposed, circumferentially spaced, on the base member and a wire wound about the periphery of the spacer members with a predetermined gap, and welding the end portions of each screen jacket to the base member thereby fixing the screen jacket to the base member and also forming seal means and thus constituting a single unit screen. Difficulty in welding can thereby be avoided and location and state of mounting of sleeves can be visually checked.

9 Claims, 6 Drawing Sheets

METHOD OF MANUFACTURING A SELECTIVE ISOLATION SCREEN

BACKGROUND OF THE INVENTION

This invention relates to a well screen such as an oil well screen and, more particularly, to a method of manufacturing a selective isolation screen in which, in a wire wrapped screen, seal means for isolating and sealing annulus defined by spacer members disposed on the outer surface of a base member such as a slitted pipe is provided at selected locations in the longitudinal direction.

A screen which is used most frequently as a deep well screen such as an oil well screen has a perforated pipe formed with multitudes of circular openings or slits as its base member, a plurality of spacer rods extending in the longitudinal direction arranged at intervals in the circumferential direction on the outer surface of the base member and a wire wound spirally on the outer periphery of the spacer rods with a predetermined gap. By the provision of the spacer rods, annulus defined by the spacer members and extending in the longitudinal direction is formed between the inside of the wire and the outer surface of the base member over the entire periphery of the base member.

This annulus defined between the inside of the wire and the outer surface of the base member is indispensable for securing a sufficient flow rate of fluid by enabling fluid flowing from the gap of the wire to flow uniformly to openings of the base member. The provision of the annulus, however, causes the following problems.

In a case where plugging has occurred in a screen, an operation is made for dissolving or removing materials which have caused plugging by locally injecting liquid such as hydrochloric acid, diesel oil, light oil or surfectant under pressure in the radial direction from inside of the base member. This liquid, however, is dispersed vertically through the annulus and, as a result, a sufficient amount of liquid is not injected concentrically to the location at which the plugging has occurred and dissolving or removal of the plugging materials is not achieved to an expected degree.

In a screen of a type in which gravel is filled in a wellbore about the screen for preventing entering of sand into the screen by the filled gravel, fluid is injected towards the gravel in the radial direction from the inside of the base member when gravel is filled in the wellbore to force the gravel down by the pressure of the fluid injected. In this case also, the fluid injected is dispersed vertically through the annulus so that gravel does not move down as expected with resulting loss of uniformity in the distribution of gravel in the wellbore and reduction in the effect of preventing entering of sand into the screen.

For overcoming the above described problems, U.S. Pat. No. 4,771,829 proposes a selective isolation screen in which seal means for isolating and sealing annulus extending in the longitudinal direction defined by spacer rods of the above described type of screen are provided at selected locations in the longitudinal direction. In this screen, as shown in FIG. 6, a plurality of spacer rods b are arranged on the outer surface of a base member a consisting of a perforated pipe, a wire c is spirally wound on the outside of the spacer rods b and cylindrical sleeves e having the same radial length as the radial length of the spacer rods b are disposed inside of the wire c at selected locations at intervals in the longitudinal direction and fixed to the spacer rods b. By disposing these sleeves e which constitute the seal means at selected locations in the longitudinal direction, the annulus defined by the spacer rods and extending in the longitudinal direction is isolated and sealed in the longitudinal direction. Accordingly, in taking a step for removing plugging or filling gravel in a wellbore, fluid injected from the inside of the base member in a screen section where plugging has occurred or gravel to be forced down exists is injected radially towards the wellbore through the gap of the wire c, for the vertical flow of the fluid in the annulus is restricted by the sleeves e provided at the upper and lower locations of the screen section where the fluid is injected.

As described above, the selective isolation screen is useful for achieving effectively removal of plugging and flow down of gravel but the prior art selective isolation screen has the following problem.

In the prior art selective isolation screen, as shown in FIG. 6, the wire c is wound over the sleeves e. The wire c is normally spot-welded to the spacer rods b. Since, as is well known, spot-welding is effected by concentrating electric current at a relatively small area to heat it locally, it is extremely difficult to spot-weld the wire c to the surface of the sleeves e which have a relatively broad area as shown in FIG. 6.

Further, in the prior art selective isolation screen, the sleeves e are covered by the wire c and the gap of the wire c is normally of a very small value of about 0.3 mm and, accordingly, the sleeves e are not seen from the outside and locations and state of mounting of the sleeves e cannot be visually checked. This structure is inconvenient in that the screen has to be used without checking the state of the sleeves even if some there is defect in mounting of a sleeve.

It is, therefore, an object of the invention to overcome the above described problem of the prior art selective isolation screen and provide a method of manufacturing a selective isolation screen in which difficulty in welding work can be avoided and location and state of mounting of the sleeves can be readily checked visually.

SUMMARY OF THE INVENTION

The method achieving the above described object of the invention is a method of manufacturing a selective isolation screen which includes a base member of a generally cylindrical configuration having a plurality of openings, a plurality of spacer members extending in the longitudinal direction which are disposed, circumferentially spaced, on the outer peripheral surface of the base member, and a wire wound about the outer periphery of the spacer members with a predetermined gap, annulus defined by the spacer members and extending in the longitudinal direction being formed between the inside of the wire and the outer surface of the base member over the entire periphery of the base member, and seal means provided at selected locations in the longitudinal direction on the base member for isolating and sealing, in the longitudinal direction, the annulus defined by the spacer members and extending in the longitudinal direction, characterized in that said method comprises steps of fitting a plurality of screen jackets one by one on the base member, each of the screen jackets comprising a plurality of spacer members extending in the longitudinal direction to be disposed, circumferentially spaced, on the base member and a wire wound about the periphery of the spacer members with a predetermined gap, and welding the end portions of each screen jacket to the base member thereby fixing the screen jacket to the base member and also forming the seal means and thus constituting a single unit screen.

By fitting the screen jackets comprising spacer members and wire one by one on the base member and welding the end portions of the screen jackets to the base member, the screen jackets are fixed to the base member and also the seal means is formed between the respective seal means. Since a wire is not wound on the seal means thus formed, difficulty of welding can be avoided and location and state of mounting of the seal means can be visually checked.

Preferred embodiments of the invention will now be described with reference to the accompanying drawings.

BRIEF DESCRIPTION OF THE DRAWINGS

In the accompanying drawings.

DESCRIPTION OF PREFERRED EMBODIMENTS

Figure 1:
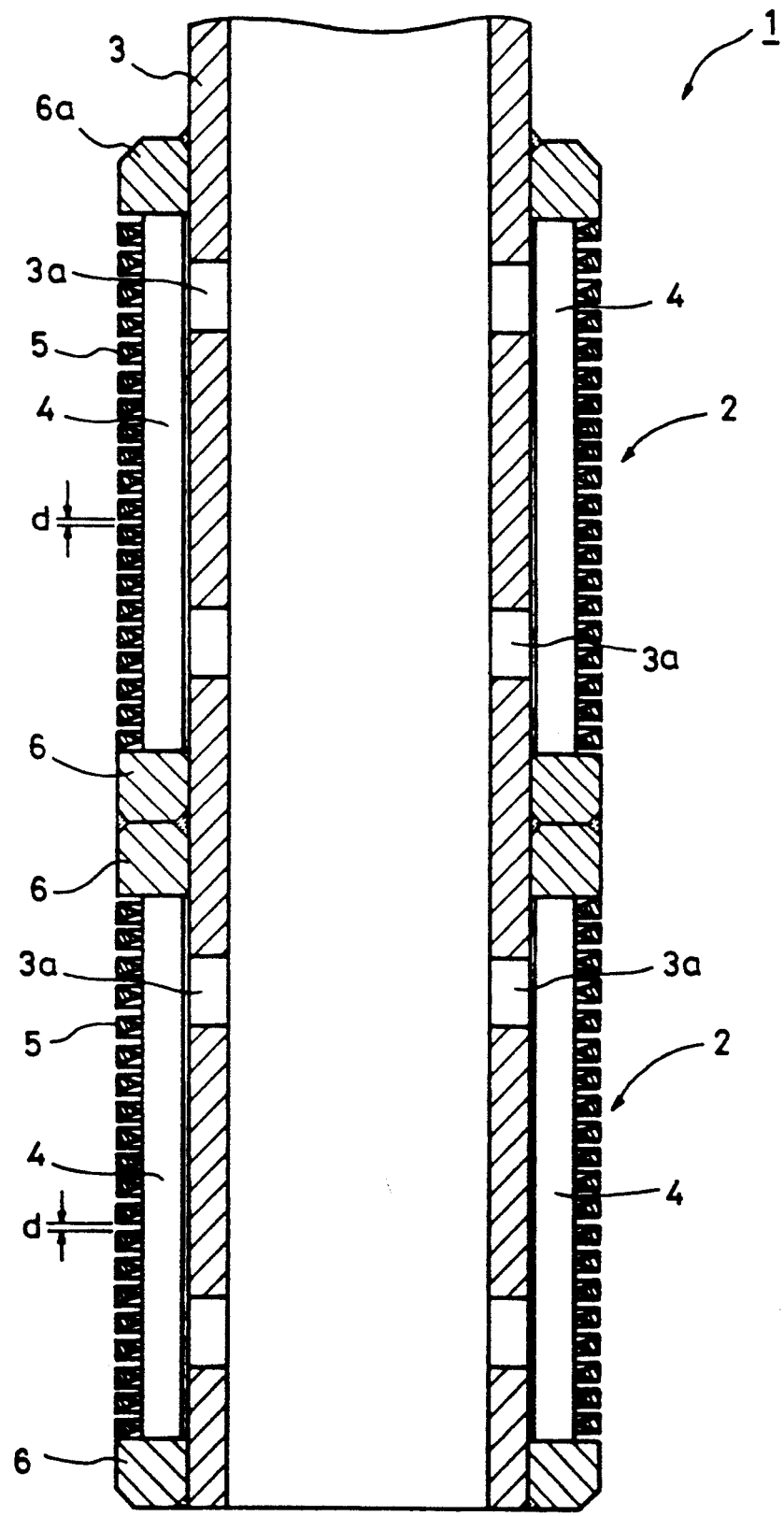
FIG. 1 is a vertical sectional view showing a part of a screen manufactured by an embodiment of the method of the invention.
Figure 2:
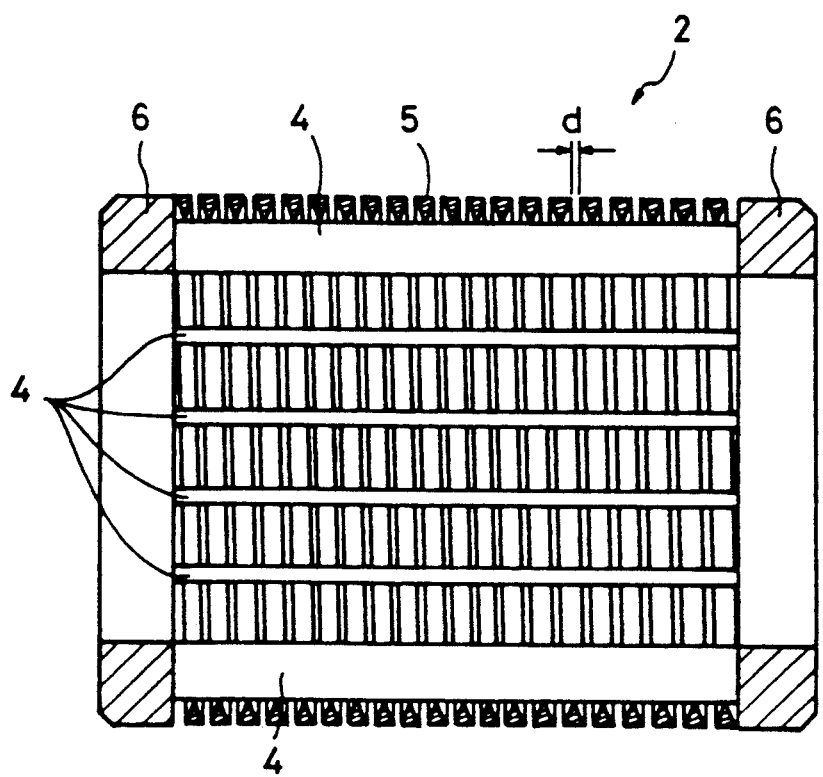
FIG. 2 is a vertical sectional view showing a screen jacket used in the above embodiment.

FIGS. 1 and 2 show an embodiment of the method of manufacturing of a selective isolation screen according to the invention. FIG. 1 is a vertical sectional view showing a part of a screen 1 manufactured by the method of this embodiment. As a base member, a perforated pipe 3 formed with multitudes of openings 3a is used and two screen jackets 2 are fitted thereon and connected together. FIG. 2 is a vertical sectional view of each screen jacket 2.

Each screen jacket 2 is composed by winding a wire 5 with a gap d of a predetermined width on the outer periphery of spacer members 4 extending in the longitudinal direction to be disposed, circumferentially spaced, on the outer surface of the perforated pipe 3 and attaching annular sleeves 6 to the end portions of the sleeves 6. The wire 5 is spot-welded to the spacer members 4 at each crossing point with them.

This screen jacket 2 is fitted at a predetermined location on the perforated pipe 3 and then a next screen jacket 2 is likewise fitted on the perforated pipe 3. The adjacent annular sleeves 6 of the adjacent screen jackets 2 are brought into abutting engagement with each other and, if necessary, welded together whereby the respective screen jackets 2 are connected together. In this manner, the screen jackets 2 of a necessary number are fitted one by one on the perforated pipe 3 and connected to one another. Then, as shown in FIG. 1, the respective annular sleeves 6 are welded at their inner lower peripheral portions to the outer surface of the perforated pipe 3 by means of a known welding method such as TIG. The adjacent annular sleeves 6, 6 of the screen jackets 2 connected together constitute the seal means. The uppermost sleeve 6a is an endless sleeve.

Figure 4:
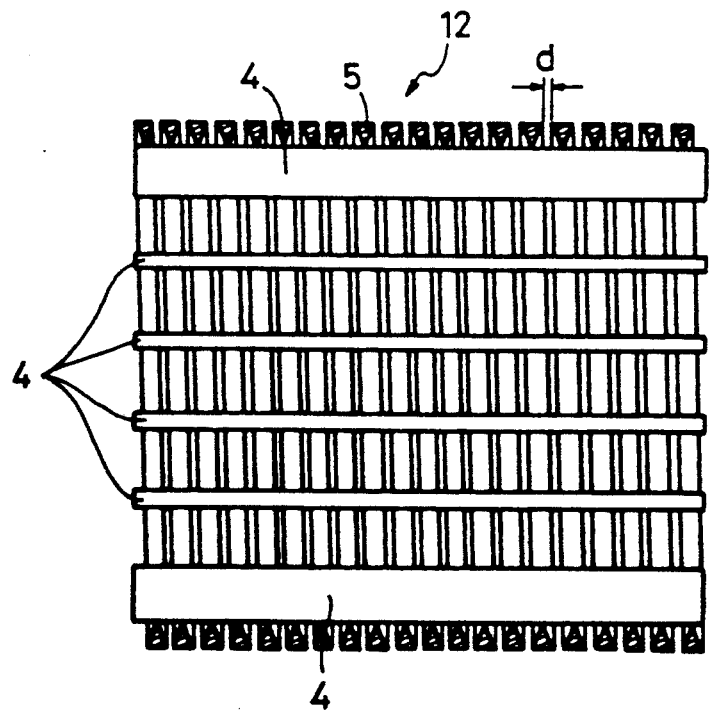
FIG. 4 is a vertical sectional view showing a screen jacket used in this embodiment.
Figure 3:
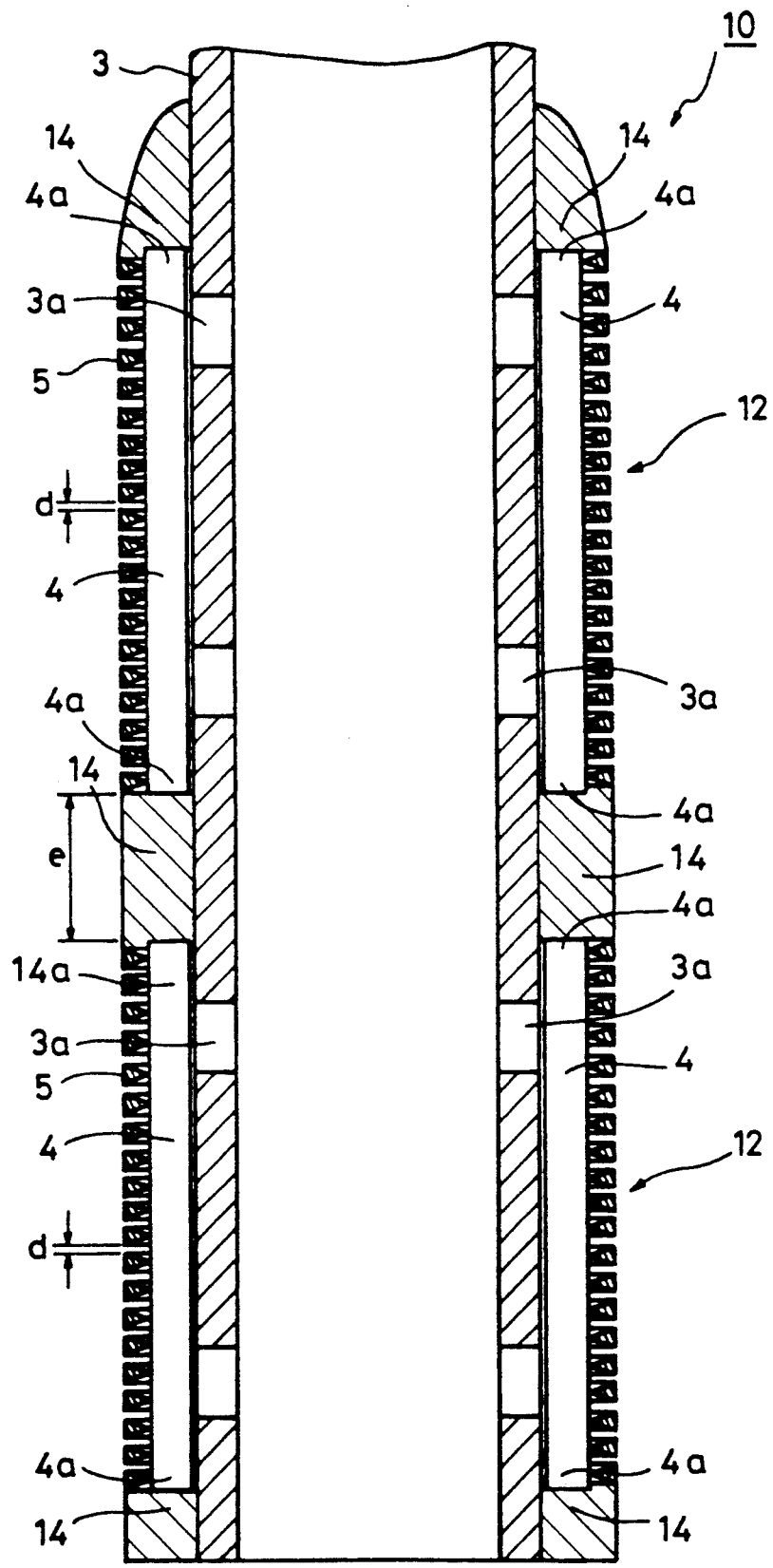
FIG. 3 is a vertical sectional view showing a part of a screen manufactured by another embodiment of the invention.

FIGS. 3 and 4 show another embodiment of the method of manufacturing of the screen according to the invention. FIG. 3 is a vertical sectional view of a screen 10 manufactured by using the method of this embodiment showing a state of two screen jackets 12 fitted on a perforated pipe 3. FIG. 4 is a vertical sectional view of each screen jacket 12. In FIGS. 3 and 4, the same component parts as those in FIGS. 1 and 2 are designated by the same reference characters and detailed description thereof will be omitted.

As will be apparent from FIG. 4, the screen jacket 12 used in this embodiment consists only of spacer members 4 and a wire 5 and has no annular sleeves 6 as in the screen jacket 2 used in the embodiment of FIGS. 1 and 2.

After these screen jackets 12 of a necessary number are fitted one by one on the perforated pipe 3 with a predetermined space e between adjacent screen jackets 12, the end portions 4a of the spacer members 4 are welded to the outer surface of the perforated pipe 3 by a known welding method such as TIG so as to seal off the space between the respective end portions 4a of the spacer members 4 from outside with welding material used in the welding method thereby to form a welded portion 14. Thus, by the welded portion formed at the end of each screen jacket 12, the seal means is constituted. The surface of the welded portion should preferably be formed on the same plane as the surface of the jacket. By doing so, smooth filling of gravel can be facilitated.

Figure 6:
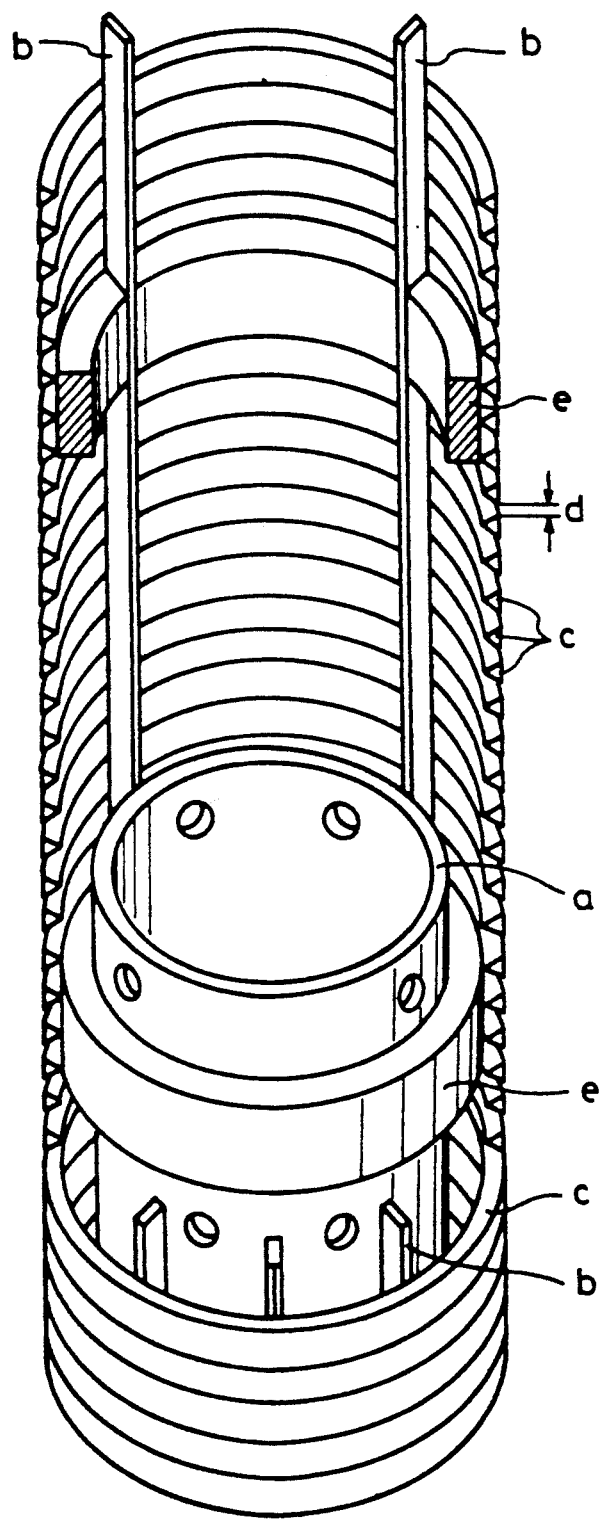
FIG. 6 is a vertical sectional view showing the prior art selective isolation screen.

It is important in making a well to fill gravel uniformly in the annulus defined between the wall of the wellbore and the outer surface of the screen. If the outer surface of the screen between adjacent screen jackets 12, 12 is recessed from the surface of the screen jackets 12, 12, the gravel is sometimes not filled in this recess so that a hollow portion is produced in the gravel filled in the annulus between the wall of the wellbore and the outer surface of the screen. This hollow portion is later filled with gravel which has transferred from around the hollow portion by either pumping of oil or pressure difference in the well but this in turn tends to cause collapse of the wall of the wellbore resulting in reduction in the oil production efficiency. In the present embodiment of the invention, the surface of the welded portion 14 (or the surface of the sleeves 6 and 26 in the embodiment of FIGS. 1 and 6) is formed on the same plane as the screen jackets and, accordingly, smooth filling of gravel is ensured and occurrence of production of the hollow portion in the gravel layer can be effectively prevented.

In the conventional screen of a type in which the base member is made of a pipe formed with openings, the number of the openings is 100–180 per one foot of the screen length. In the present invention, the number of the openings of the pipe is restricted to 1–60 per one foot of the screen length. The shape of the openings may be a circle or a slot. When the shape of the openings is a circle, they should preferably have a diameter ranging from 1/16 inches to 2 inches. When the shape of the openings is a slot, they should preferably have a width ranging from 1/16 inches to 2 inches and a length ranging from 1 inch to 10 inches. This restriction of the number of openings compared with the conventional screens, together with forming of the seal means, contributes to reduction of loss of water caused by deviation of a part of water poured from above into the annulus between the wall of the wellbore and the outer surface of the screen, said deviation being produced by flow of water through the space between the spacer members inside of the wire and also flow of water into the pipe through the openings of the pipes. A sufficient flow speed of water for filling gravel to the bottom of the screen can thereby be ensured.

Figure 5:
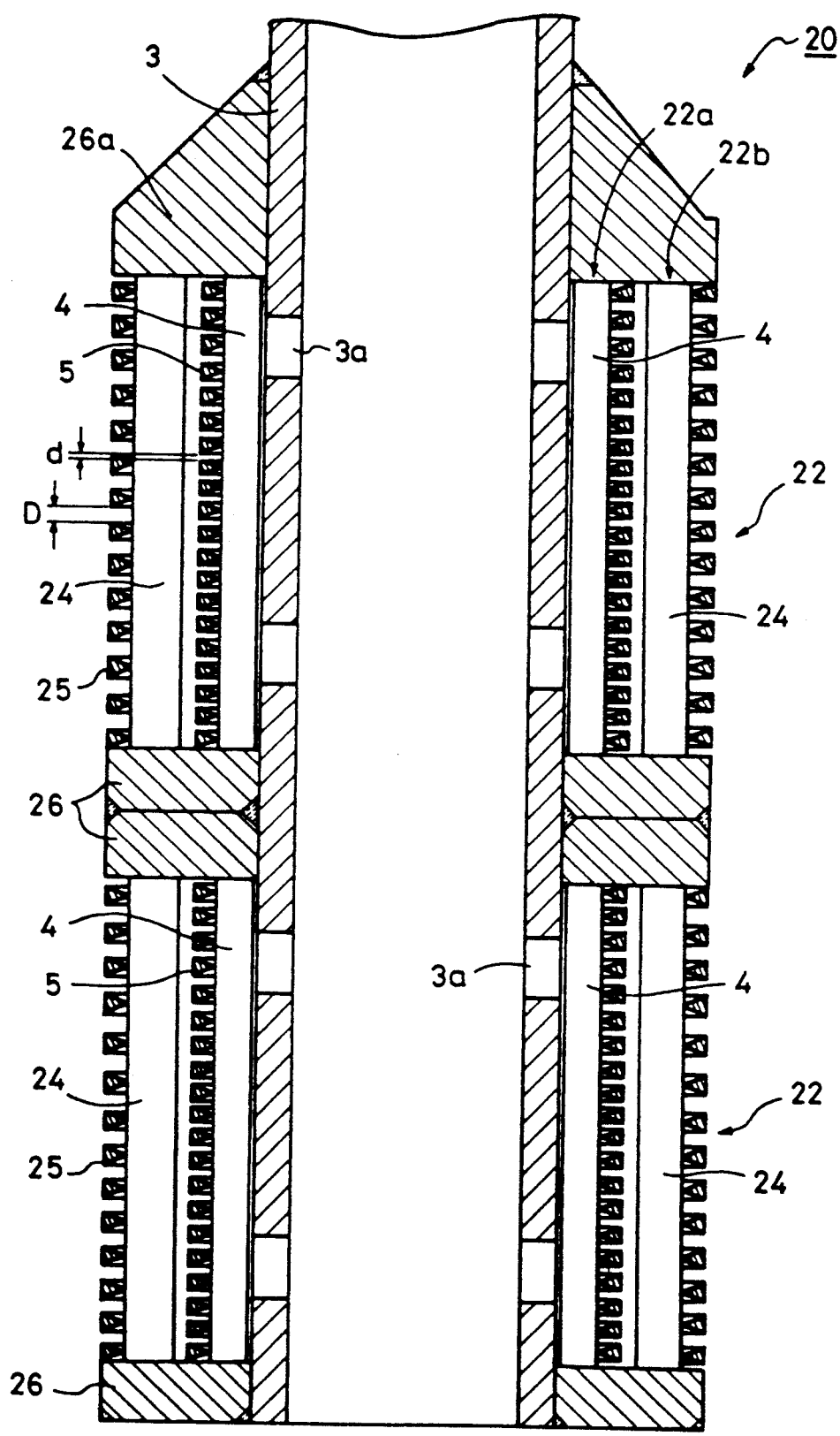
FIG. 5 is a vertical sectional view showing a part of a screen manufactured by still another embodiment of the invention.

FIG. 5 is a view for explaining a still another embodiment of the method of manufacturing a screen according to the invention. FIG. 5 is a vertical sectional view of a screen 20 manufactured by the method of this embodiment in which two screen jackets 22 are fitted on a perforated pipe 3. In FIG. 5, the same component parts as those in FIGS. 1 and 2 are designated by the same reference characters and detailed description thereof will be omitted. Reference character 26a denotes an end sleeve.

In this embodiment, each screen jacket 22 is composed of an inner screen jacket 22a which consists of spacer members 4 and a wire 5 which are of the same construction as the screen jacket of the embodiment shown in FIG. 2 and an outer screen jacket 22b provided outside of the inner screen jacket 22a with a predetermined gap, said outer screen jacket 22b having spacer members 24 and a wire 25 wound on the outside thereof with a gap D which is larger than the gap d. Common annular sleeves 25 are fixed to the end portions of the spacer members 4 and 24 of these screen jackets 22a and 22b. The wire 25 is spot-welded to the spacer members 24 at each crossing point with them. The wire 25 is not limited to the spiral wire as shown but a plurality of rings arranged at intervals may be welded to the spacer members 24. If necessary, the gap D may be made equal to or smaller than the gap d.

Screen jackets 22 of a necessary number are fitted on the perforated pipe 3 in the same manner as in the embodiment of FIG. 1 and the annular sleeves are welded together if necessary. By welding the respective annular sleeves 26 at their inner lower edge portions to the outer surface of the perforated pipe 3 whereby the seal means is formed by the adjacent annular sleeves 26, 26 of the screen jackets 22.

In a case where the screen 20 manufactured by the method of FIG. 5 is used in a horizontal well having an horizontally extending portion or an inclined well having an obliquely extending portion along an oil layer, when this screen is pushed into a well, the outer screen jacket 22b of the screen 20 passing through a bent portion of the well is deformed by the bending of the wall surface of the well. The wire 5 of the inner screen jacket 22a does not come into contact with the wall surface of the bent portion of the well but is elastically deformed inside of the outer screen jacket 22b and thereafter is restored to the original shape after reaching the horizontal portion of the well. Since the gap is provided between the spacer members 24 of the outer screen jacket 22b and the wire 5 of the inner screen jacket 22a, adjustment can be made by properly setting this gap so that the wire 5 will not contact with the spacer members 24 when the screen passes through the bent portion of the well, or, even if the wire 5 contacts the spacer members 24, the wire 5 will not be plastically deformed under the action of excessive load. According to this embodiment, therefore, damage or deformation of the screen which tends to occur when the screen 20 forced into the well passes through the bent portion of the well can be effectively prevented and the gap d of the wire 5 of the inner screen jacket 22a can be maintained at a constant value. This double layer screen is effective also for preventing formation of sand and protecting the screen from corrosion from movement of fluid and sand.

In the above described embodiments, the perforated pipe 3 is used as the base member. The base member, however, is not limited to the perforated pipe but it may be, for example, a spiral wire extending in the axial direction of the screen. Alternatively, the base member may be composed of plural rings arranged in parallel at a predetermined interval in the axial direction of the screen so as to form slits which continue in the circumferential direction of the screen. These base members are disclosed in Japanese Patent Publication No. 32275/1983.

The base member may be a cylindrical member made by winding a spiral wire on the outside of a plurality of rods arranged in the axial direction at a predetermined interval to form a cylindrical configuration and welding the rods and wire together to form an integral cylindrical body. This type of base member is used in a double cylinder type screen disclosed by Japanese Patent Publication No. 54516/1989.

In the above described embodiments, a wedge wire is used as the wires 5 and 25. The wire however is not limited to the wedge wire but wires of other cross sections such as a rhomb, circle and square may also be used. Depending upon conditions under which the wires 5 and 25 are used, these wires 5 and 25 may be welded to a part of spacer members only instead of being welded to the spacer members at all crossing points.

The length of the seal means and the screen jackets may be suitably determined depending upon the conditions of the well. The seal means may be of a length ranging from one foot to more than half the length of the base member. It is also possible to vary the lengths of plural seal means on a single base member. The length of the screen jackets is equal to a length of a portion of the base member which is not covered with the seal means or which is not required for threading or provision of a centralizer.

Figure 7:
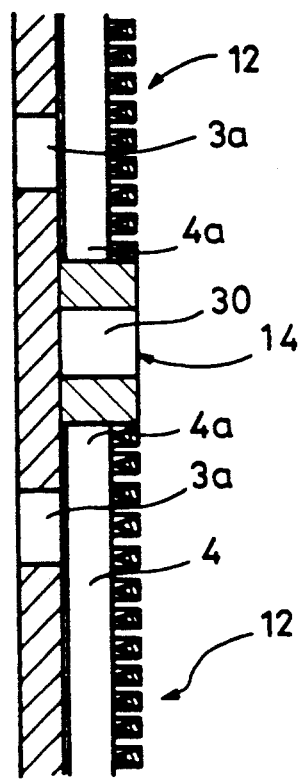
FIG. 7 is a partial sectional view of another example of the welded portion.

In the embodiment of FIG. 3, instead of forming the welded portion 14 entirely with the welding material as illustrated, steel short cylinders 30 may be fitted on the base member between the adjacent screen jackets as shown in FIG. 7 and this short cylinder 30 may be welded with the adjacent screen jackets 12, 12 to form the welded portion 14.

We claim:

1. A method of manufacturing a selective isolation screen which includes a base member of a generally cylindrical configuration having a plurality of openings, a plurality of spacer members extending in the longitudinal direction which are disposed and circumferentially spaced, on the outer peripheral surface of the base member, and a wire wound about the outer periphery of the spacer members said wire being spaced to define a predetermined gap between the windings of said wire, an annulus defined by the spacer members which extends in the longitudinal direction between the inside of the wire and the outer surface of the base member over the entire periphery of the base member, and seal means being provided at selected locations in the longitudinal direction, said annulus being defined by said spacer members and extending longitudinally characterized in that said method comprises the steps of:

fitting a plurality of screen jackets one by one on the base member, each of the screen jackets comprising a plurality of spacer members extending in the longitudinal direction to be disposed, circumferentially spaced, on the base member and a wire wound about the periphery of the spacer members with a predetermined gap; and welding the end portions of each of the screen jackets to the base member thereby fixing each of the screen jackets to the base member and also forming the seal means at adjacent end portions of the screen jackets and thus forming a single screen unit.

2. A method for manufacturing a selective isolation screen as defined in claim 1 wherein said base member is a pipe formed with 1-60 openings per one foot of the length of the screen.

3. A method for manufacturing a selective isolation screen as defined in claim 1 wherein said base member is a spiral wire extending in the axial direction of the screen.

4. A method for manufacturing a selective isolation screen as defined in claim 1 wherein said base member is made of a plurality of rings disposed in parallel at a predetermined interval so as to form slits which continue in the circumferential direction of the screen.

5. A method for manufacturing a selective isolation screen as defined in claim 1 wherein said base member is a cylindrical member made by winding a spiral wire on the outside of a plurality of rods arranged in the axial direction at a predetermined interval to form a cylindrical configuration and welding the rods and wire together to form an integral cylindrical body.

6. A method of manufacturing a selective isolation screen as defined in claim 1 wherein said screen jackets constitute inner screen jackets and there are provided, on the outside of the inner screen jackets, outer screen jackets comprising a plurality of circumferentially spaced spacer members extending in the longitudinal direction and a wire wound about the outer periphery of the spacer members said wire being spaced to define a predetermined gap between the windings of said wire.

7. A method of manufacturing a selective isolation screen as defined in claim 1 wherein an annular screen is provided at the end portions of each of the screen jackets and the seal means is formed by abutting adjacent sleeves of the respective screens to each other and welding the sleeves to the base member.

8. A method of manufacturing a selective isolation screen as defined in claim 1 wherein the seal means is formed by welding the end portions of each of the screen jackets in such a manner that the annulus between the end portions of the spacer members which are adjacent to each other in the circumferential direction is sealed from the outside.

9. A method of manufacturing a selective isolation screen as defined in claim 1 wherein the outer surface of said seal means is formed on the same plane as the outer surface of said screen jackets.

* * * * *